March 22, 1960
E. LORETAN
2,929,158
DEMONSTRATION SAMPLE OF AT LEAST ONE SHOCK
ABSORBING BEARING ESPECIALLY FOR TIMEPIECE
Filed July 2, 1958
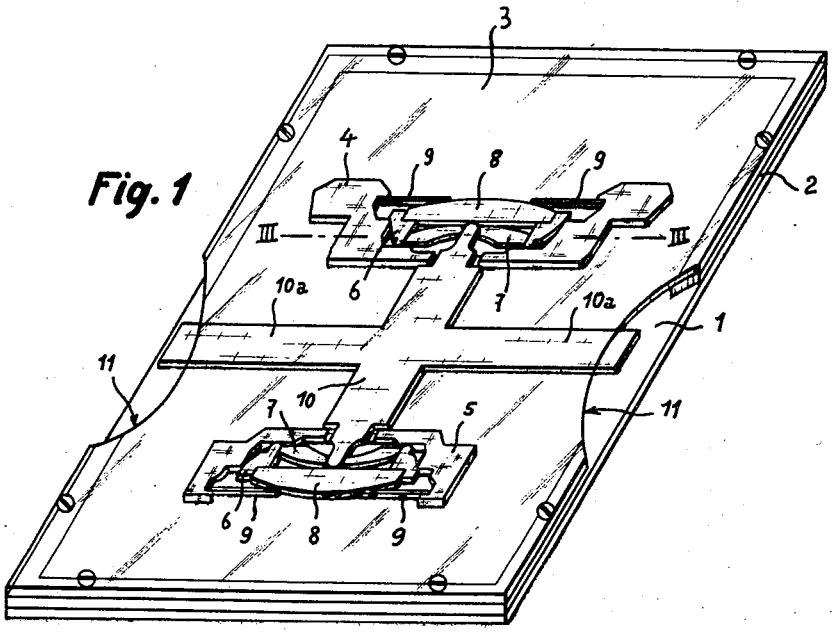
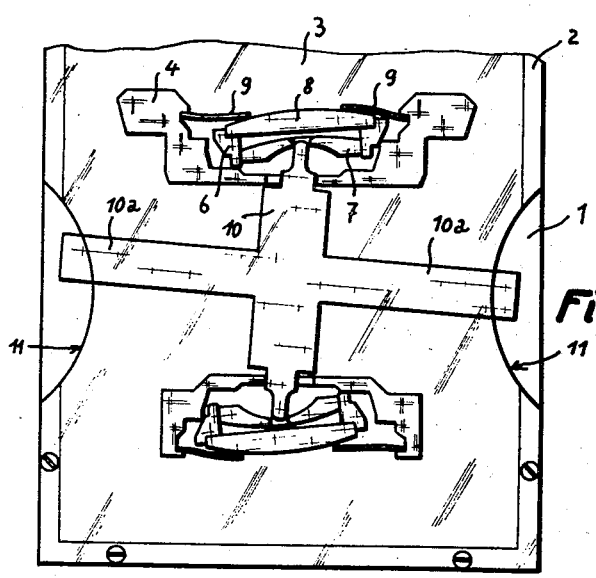
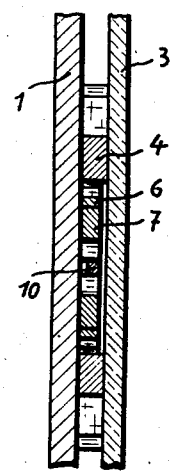
INVENTOR
EDOUARD LORETAN
BY
ATTORNEY

2,929,158

DEMONSTRATION SAMPLE OF AT LEAST ONE SHOCK ABSORBING BEARING ESPECIALLY FOR TIMEPIECE

Edouard Loretan, Le Sentier, Switzerland, assignor to Parechoc S.A., Le Sentier, Switzerland, a firm of Switzerland Application July 2, 1958, Serial No. 746,181

2 Claims. (Cl. 35—13)

The present invention has for an object to provide a demonstration sample of at least one shock absorbing bearing especially for timepiece.

This sample is characterised by the feature that it comprises elements the thickness of which is small with respect to the two other dimensions, arranged on a support so as to represent an axial section of the bearing as well as of the shaft borne in this bearing, some of these elements being movable on this support and the other ones being fixed, the whole in such a way that by displacing the element representing the shaft, displacements of the movable elements are produced, which show thus the operation of the bearing.

The annexed drawing shows, by way of example, one embodiment of the object of the invention.

Fig. 1 is a perspective view of the sample.

Fig. 2 is a plan view thereof, and,

Fig. 3 is a sectional view of a detail, along the line III—III of Fig. 1, in which the thicknes of the elements has been greatly exaggerated so as to increase the clearness of the drawing.

The represented demonstration sample comprises a base plate 1 on which is mounted a peripheral edge strip 2 constituting a distance piece on which is secured an upper plate 3. This edge could be replaced by four blocks situated on the four corners. The several elements of the sample are made of plastic material; they could be made of metal, except the upper plate 3 which has to be transparent.

Between the plates 1 and 3 are located elements, the thickness of which is small with respect to the two other dimensions, intended to represent the axial section of two timepiece bearings situated on the same axis. The elements 4 and 5 represent each the section of a bearing support intended to be forced in a balance cock and in a pillar plate of a clockwork; these elements 4 and 5 have the same thickness as the edge 2; they are secured to the plate 1 by means of an adhesive; moreover, as their thickness is the same as the distance separating plate 1 from plate 3, this latter presses elements 4 and 5 against plate 1, whereby these elements are prevented from displacing themselves. Elements 6, 7 and 8, the thickness of which is less than the distance separating the plates 1 and 3, are freely located between these plates. These elements represent respectively, for each of the bearings, a setting, a hole jewel and an end stone; they can displace themselves freely between the plates 1 and 3 and are held in place and returned into their centered position by two resilient blades 9 representing the two parts of a bearing spring which would be visible in an axial section of said bearing. The ends of these blades in contact with the elements 4 and 5 have the same thickness as these elements, whereby these blades are held in place between plates 1 and 3 like elements 4 and 5, but the rest of their length is thinner so that the free ends of these blades can be displaced when the blades are elastically deformed.

Further, the sample comprises a thin element 10 representing a balance staff rotatably mounted between the two bearings, and which shows two perpendicular arms 10a representing the balance itself. The edge or frame 2 is broken in the proximity of the ends of the arms 10a and the plate 3 shows, at these places, a recess 11 which allows a finger to reach the ends of these arms. One can thus displace manually the element 10, that produces the displacement of the thin elements of the sample, which represent the movable parts of the bearings.

Fig. 2 shows the sample as it appears when the staff is submitted to a rocking movement in the clockwise direction. It can be seen that the sample illustrates, in a very suggestive manner, the simultaneous operation of the two shock absorbing bearings. When the extremities of the arms 10a are released, the resilient blades 9 return the movable elements of the bearings, and consequently the staff 10 too, into their centered position. In order to make the sample the most demonstrative as possible, the several elements will preferably be painted with different colours.

In the case where the sample according to the invention will be placed in a shop-window, for instance, one could provide a mechanical device producing movements of the element 10 which represents the balance staff.

As a modification, one could execute the fixed elements of the sample, except the upper plate, in one piece with the base plate; these elements could be obtained for instance by stamping, when the base plate is of metal.

What I claim is:

1. In a demonstration sample of two bearings for the balance staff of a time piece, elements the thickness of which is small with respect to the two other dimensions, and two plates, at least one of which is transparent, secured to each other at a distance one from the other, said elements being located between said two plates in such an arrangement that they represent an axial section of the said bearings as well as of the balance staff situated between them, the element representing said staff being provided with two lateral arms representing said balance and the ends of which are reachable with a finger, some of said elements, which represent the movable parts of the bearings, being movable between said plates, and the other ones, which represent the stationary parts of the bearings, being fixed, the whole in such a way that, by acting manually on the ends of said arms, one moves the element representing the staff and produces thus displacements of the said movable elements, which displacements show the simultaneous operation of the two bearings.

2. In a demonstration sample of two bearings for a shaft of a timepiece, elements the thickness of which is small with respect to the two other dimensions, and two plates, at least one of which is transparent, secured to each other at a distance one from the other, said elements being located between said two plates in such an arrangement that they represent an axial section of the said bearings as well as of the shaft situated between them, the element representing said shaft being provided with two lateral extensions the ends of which are reachable with a finger, some of said elements, which represent the movable parts of the bearings, being movable between said plates, and the other ones, which represent the stationary parts of the bearings, being fixed, the whole in such a way that, by acting manually on the ends of said extensions, one moves the element representing the shaft and produces thus displacements of the said movable elements, which displacements show the simultaneous operation of the two bearings.

References Cited in the file of this patent

UNITED STATES PATENTS

| | | |
|---|---|---|
| 1,722,659 | Clark | July 30, 1929 |
| 2,239,682 | Marti | Apr. 29, 1941 |
| 2,263,413 | Beckman | Nov. 18, 1941 |
| 2,276,392 | Headley | Mar. 17, 1942 |
| 2,722,060 | Flower et al. | Nov. 1, 1955 |